(12) United States Patent
Eggen et al.

(10) Patent No.: US 6,388,715 B1
(45) Date of Patent: May 14, 2002

(54) TELEVISION RECEIVER

(75) Inventors: Josephus H. Eggen; Bartel M. Van De Sluis, both of Eindhoven; Jouke A. Rypkema, Utrecht, all of (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/287,428

(22) Filed: Apr. 7, 1999

(30) Foreign Application Priority Data

Apr. 8, 1998 (EP) .............................. 98201121

(51) Int. Cl.[7] .............................. H04N 5/50
(52) U.S. Cl. .............. 348/569; 348/570; 348/563; 348/906; 725/39; 725/58
(58) Field of Search .............................. 348/569, 570, 348/563, 564, 906; 725/39, 58, 59; H04N 5/445, 5/50

(56) References Cited

U.S. PATENT DOCUMENTS

| | | | | |
|---|---|---|---|---|
| 5,444,499 A | * | 8/1995 | Saitoh | 348/734 |
| 5,557,724 A | * | 9/1996 | Sampat et al. | 395/157 |
| 5,585,866 A | * | 12/1996 | Miller et al. | 348/731 |
| 5,694,176 A | * | 12/1997 | Bruette et al. | |
| 6,008,803 A | * | 12/1999 | Rowe et al. | 345/327 |
| 6,133,962 A | * | 10/2000 | Proehl et al. | 348/569 |

FOREIGN PATENT DOCUMENTS

| | | | |
|---|---|---|---|
| EP | 0721253 A2 | * | 7/1996 |
| EP | 0742669 A1 | * | 11/1996 |
| GB | 2326547 A | * | 12/1998 |
| WO | WO 9607270 A1 | * | 3/1996 |

* cited by examiner

*Primary Examiner*—Michael Lee
*Assistant Examiner*—Trang U. Tran
(74) *Attorney, Agent, or Firm*—Laurie E. Gathman

(57) ABSTRACT

A television receiver with an electronic program guide (EPG) is disclosed, which allows a user to navigate through an overview of scheduled television programs each belonging to one of a plurality of program categories. Upon highlighting a program item in the guide, or upon highlighting a pictogram representing an available program category, the receiver produces (14) an auditive signal (AUD) which is characteristic of the relevant program category. This provides an additional feedback to the user which eases the process of navigating through on-screen EPG menus.

In embodiments of the receiver, the respective auditive signal is also produced as an alert signal (reminder) that a desired program is about to start. A sequence of such reminders may be given at different instants of time before the program starts. By manipulating (15) a parameter, which is characteristic of a perceived distance from user to receiver (e.g. volume), the auditive signal also indicates the time to lapse until the start of the desired program.

20 Claims, 3 Drawing Sheets

TELEVISION RECEIVER

FIELD OF THE INVENTION

The invention relates to a television receiver for receiving television programs each belonging to one of a plurality of program categories.

BACKGROUND OF THE INVENTION

Electronic program guides (EPGS) have recently been developed to allow a television viewer to navigate through the large amount of television channels which he can nowadays receive. An EPG provides an overview of present and future television programs. For each television program, it provides data such as the channel on which the program will be broadcast, the scheduled start time, length, title, description, etc. The EPG also classifies television programs according to type such as movies, news magazines, sports events, documentaries, etc., movie subtypes such as drama, action, etc., sports subtypes such as football, basketball, etc. and provides names of movie actors, news readers, quiz masters, etc. These and other program characteristics are hereinafter collectively denoted "categories".

With an EPG television receiver, the viewer cannot only access programs by channel (an electronic equivalent of printed program guides), he can also access television programs belonging to a certain category.

In practical embodiments of EPG television receivers, most emphasis is placed on the graphic layout of EPG screens. The user interface, including the presentation of information, is graphically oriented. A disadvantage thereof is that the television screen is often completely filled up with EPG information which makes it difficult to read at a normal viewing distance. It is necessary to sit in front of the television receiver and other members of the family are disturbed in watching the current program.

OBJECT AND SUMMARY OF THE INVENTION

It is an object of the invention to further improve television receivers of the type described above.

To this end, in accordance with the invention, a television receiver for receiving television programs belonging to one of a plurality of program categories comprises: means for displaying menu items associated with respective program categories; user-operable input means for highlighting one of said menu items; and means for reproducing, in response to highlighting a menu item, an auditive signal being characteristic of the corresponding program category.

Examples of characteristic sounds are: a gong-stroke for news programs; a cheering audience for sports programs; a part of the tune of a James Bond film for movies. Thus, presenting program characteristics visually as well as auditively alleviates the problem that not all displayed information is equally legible. There is a greater chance of correctly interpreting feedback.

An embodiment of the receiver further comprises user-operable means for selecting a desired television program to be received when it is broadcast; and means for reproducing the auditive signal which is characteristic of the program category of the selected television program when said television program is about to be broadcast. In such an embodiment, the user is given an alert signal to remind him that a desired program starts or is about to start. The signal also indicates to which category that program belongs. For example, a cheering audience reminds the user of the football match which is about to start. The receiver even does not necessarily need to be fully operative.

In a particular advantageous embodiment of the television receiver, the means for reproducing the auditive signal include means for manipulating a parameter of the signal which is indicative of the time to lapse until the start of the selected television program. Preferably, said parameter is a parameter which is characteristic of a perceived distance, a larger perceived distance representing a larger time to lapse. Examples of such parameters are sound intensity, presence of high frequencies, and intensity of added reflections added to the signal. Experiments have shown that users quickly and easily associate perceived distance of sound with distance in time, and appreciate this metaphor to indicate the "urgency" of the reminder signal.

DESCRIPTION OF EMBODIMENTS

Figure 1:
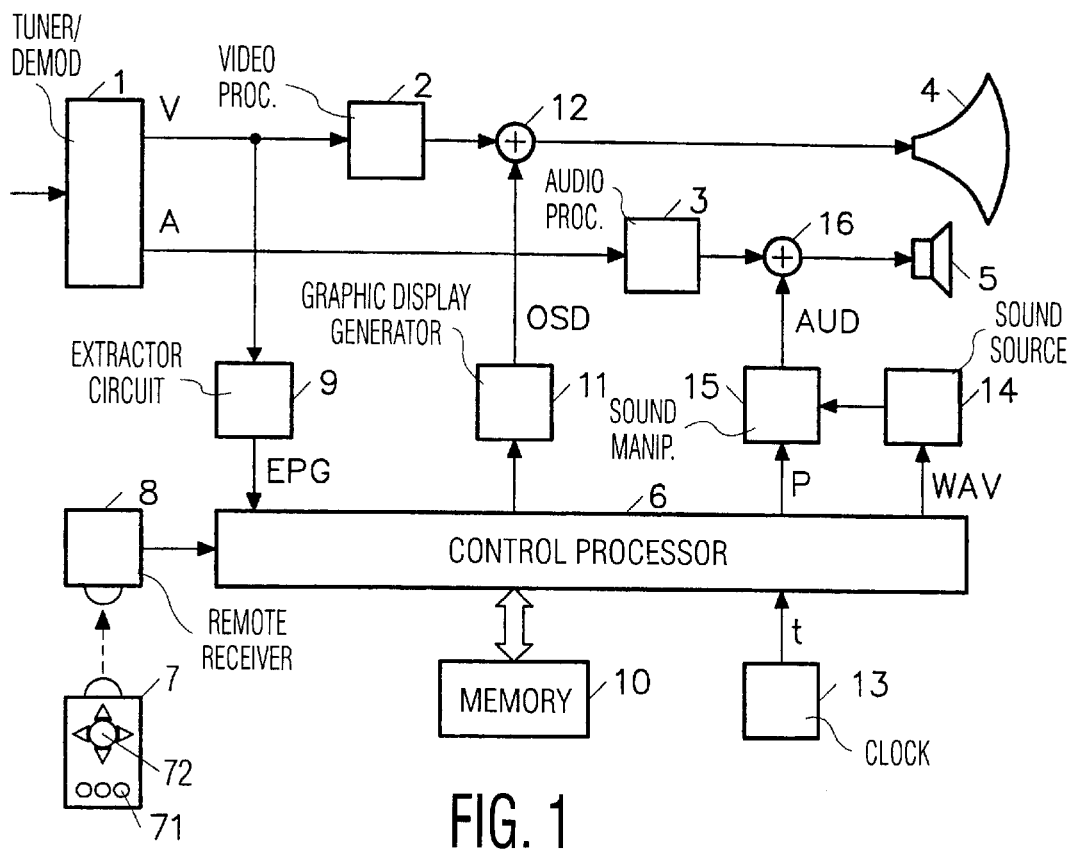
FIG. 1 shows a schematic diagram of a television receiver in accordance with the invention.

FIG. 1 shows a schematic diagram of a television receiver in accordance with the invention. The receiver comprises a cable or terrestrial tuner/demodulator 1 which applies a received video signal V and audio signal A to a video processor 2 and an audio processor 3, respectively. The video signal V is displayed on a display screen 4 and the audio signal A is reproduced by a speaker 5. The receiver further comprises a control processor 6, for example, a microprocessor, for controlling the tuner/demodulator 1, the video processor 2 and the audio processor 3 in a further conventional manner in response to user commands received from a remote control device 7 via a remote control receiver 8.

The receiver further comprises an EPG extraction circuit 9 for extracting electronic program guide data which is transmitted in the vertical blanking interval of the video signal V of one or more television channels. Optionally, or in addition thereto, the receiver may receive EPG data through other channels, inter alia, through a modem or a transportable storage medium. Throughout this description, the EPG data is assumed to provide a summary of current and forthcoming television programs on various channels, each program including at least a scheduled start time, a title and category data defining the program type (news, sports, movie, etc.). The EPG data is stored in a non-volatile memory and updated continuously or regularly.

Through a graphic display generator 11 and an adder stage 12, the electronic program guide is displayed on screen in response to a particular user command, e.g. pressing an EPG button 71 of the remote control device 7. To this end, an on-screen-display signal OSD is superimposed on a currently received television program or displayed instead thereof. By means of cursor keys 72 of the remote control device, the user navigates through the displayed program guide, tunes the receiver to a channel to watch a currently broadcast program, or selects a desired program for viewing or recording when it is broadcast later. In the latter case, the scheduled program start time is stored in an appropriate location of the memory 10 and continuously compared with a real-time clock device 13.

Figure 2:
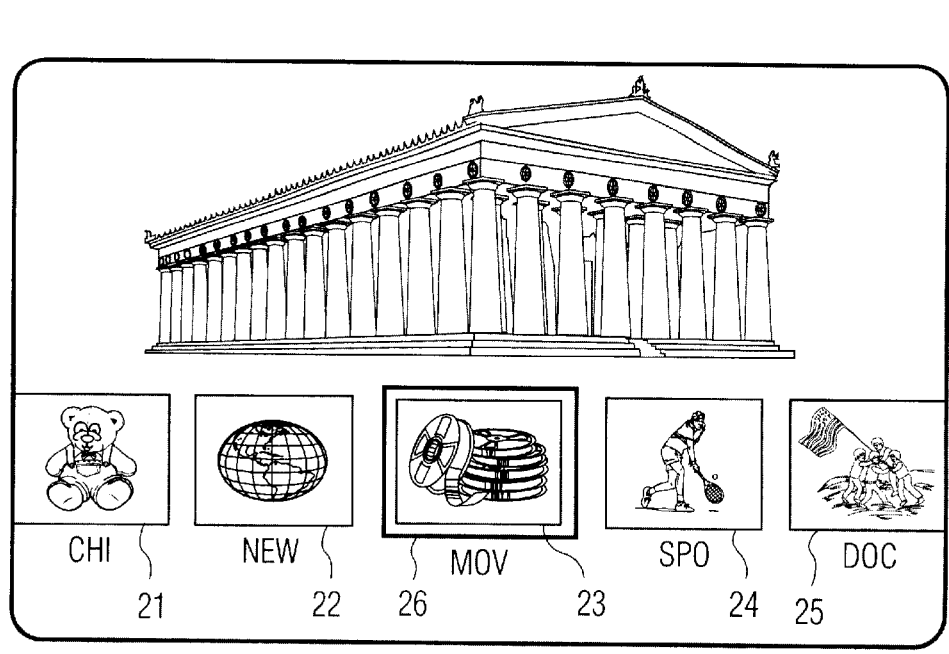
FIG. 2 shows a display screen to illustrate the operation of the receiver in accordance with the invention.

The microprocessor 6 is also arranged to cause the graphic display generator 11 to display menu items on screen to facilitate easy navigation through the program guide. As an example thereof, FIG. 2 shows a display screen 20 with a horizontal band of pictograms denoting program categories. A pictogram 21 denotes programs for children, a pictogram 22 denotes news magazines, a pictogram 23 denotes movies, a pictogram 24 denotes sports events, and a pictogram 25 denotes documentaries. One of the pictograms is highlighted. In the example shown, movie pictogram 23 is highlighted by a colored border 26 and enlarged letter size, but various different ways of highlighting menu items are known in the art. The band of pictograms can be scrolled horizontally by means of the cursor keys 72 of the remote control device 7 (FIG. 1) to selectively highlight a pictogram and reveal further pictogram categories. Upon pressing a confirmation key, the currently highlighted pictogram is selected. In this example, such a confirmation causes the microprocessor to display a summary of all television programs belonging to the selected category.

FIG. 1 shows that the television receiver further comprises a sound source 14 and sound-manipulating means 15. The sound source generates an auditive signal AUD and applies it through an adder stage 16 to the speaker 5. The character or nature of the auditive signal is controlled by the microprocessor in the form of a waveform-defining control signal WAV. A plurality of different waveform-defining control signals is stored in the memory 10. More in particular, a waveform which is characteristic of said program category is defined for each program category. For example, for news programs, the auditive signal is a gong-stroke, for sports it is a cheering audience, for action movies it is a part of the tune of a James Bond film. The respective waveforms can be preprogrammed by the manufacturer, recorded from an external audio source, copied from a transportable memory medium or downloaded from the EPG data base.

In accordance with the invention, the receiver reproduces a respective auditive signal when a pictogram is highlighted. Thus, with reference to FIG. 2, when the band of pictograms is moved to the right and the news pictogram is highlighted, a gong-stroke is reproduced. Similarly, when the band of pictograms is moved to the left and the sports pictogram is highlighted, a cheering audience can be heard. The television receiver thus presents selectable menu items both visually and auditively. An advantage thereof is, inter alia, that pictograms can be made smaller so that "screen pollution" is reduced, without affecting the accessibility of menus.

Figure 3:
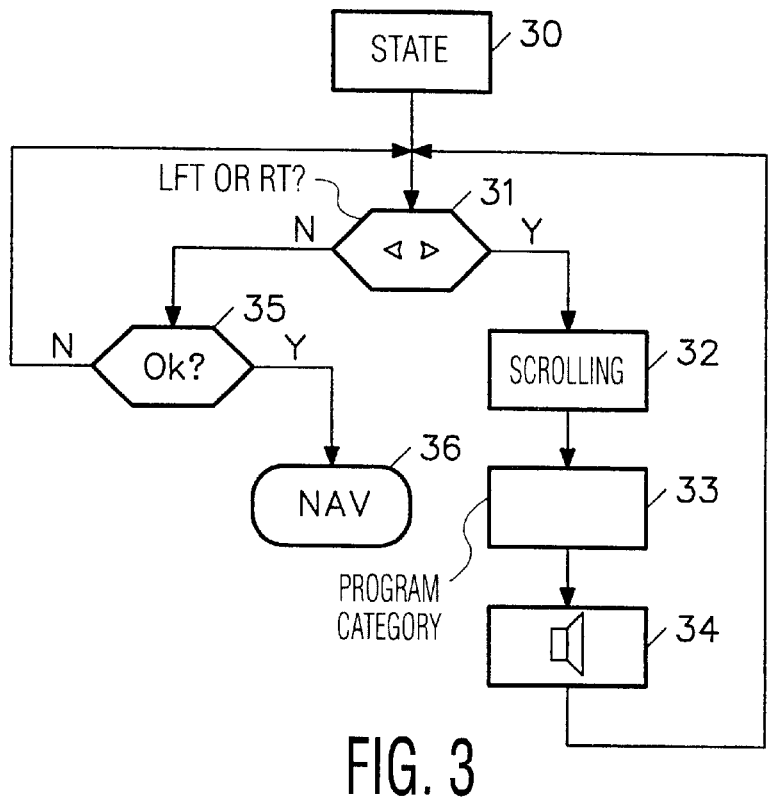
FIGS. 3–5 show flow charts to illustrate the operation of the receiver in accordance with the invention.

FIG. 3 shows a flow chart of operations carried out by the microprocessor 6 to obtain the above described benefits. Block 30 denotes the state in which a band of pictograms is displayed on screen as shown in FIG. 2, the pictogram in the middle being highlighted. In a step 31, it is determined whether the left or right cursor is operated. If that is the case, a step 32 is performed in which the band is scrolled by one pictogram position to the left or right, respectively. In a step 33, the microprocessor determines which program category the currently highlighted pictogram represents. Then, in a step 34, the microprocessor reads the waveform-defining control signal associated with said program category from memory 10 and applies said signal to the sound source 14 for reproduction by the speaker 5. If the user has eventually identified a desired program category, he will press a confirmation key. This is detected in a step 35. In response thereto, the microprocessor jumps to a sub-program 36 for navigating through all television programs belonging to the selected category.

Figure 4:
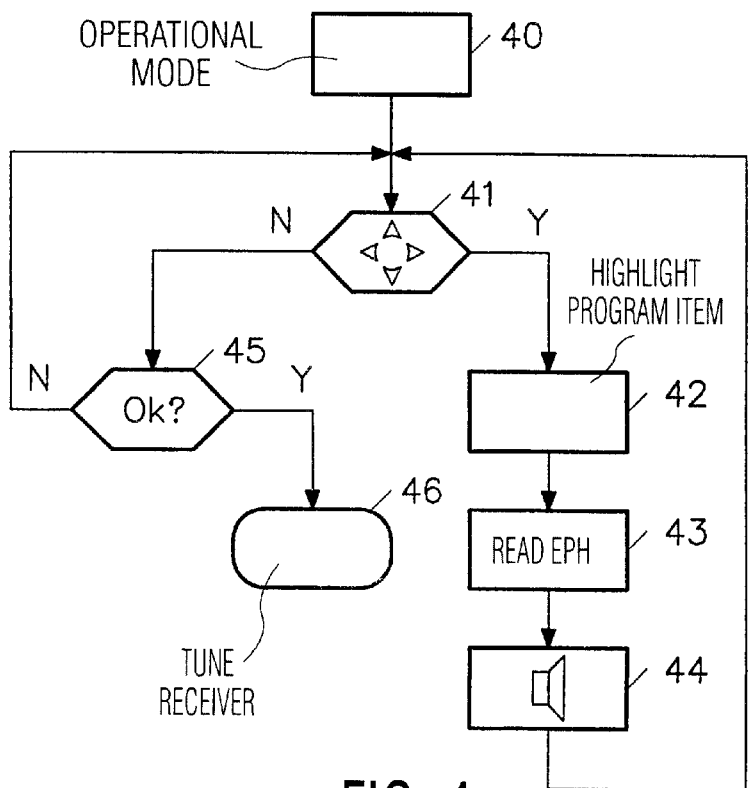

FIG. 4 shows a flow chart of operations of the television receiver to navigate through a guide of programs of different categories, for example, all programs on a selected channel ("What's on Channel One?") or all programs currently broadcast ("What's on now?"). Block 40 denotes the step of entering this operational mode in response to a user command. In a step 41, it is determined whether a cursor key is operated. If that is the case, a corresponding program item of the guide is highlighted in a step 42. In a step 43, the microprocessor reads the stored EPG data to identify which program category the currently highlighted program belongs to. Then, in a step 44, the microprocessor causes the corresponding auditive signal to be reproduced. In this manner, an auditive feedback is given of program categories while the user moves the cursor through the program items. Eventually, the user selects a desired program by pressing an Ok button. In that case (step 45), the microprocessor jumps to a sub-program 46 for tuning the receiver to the relevant channel (if the program is being broadcast or will be broadcast shortly) or for reminding the user when the program is about to start.

Figure 5:
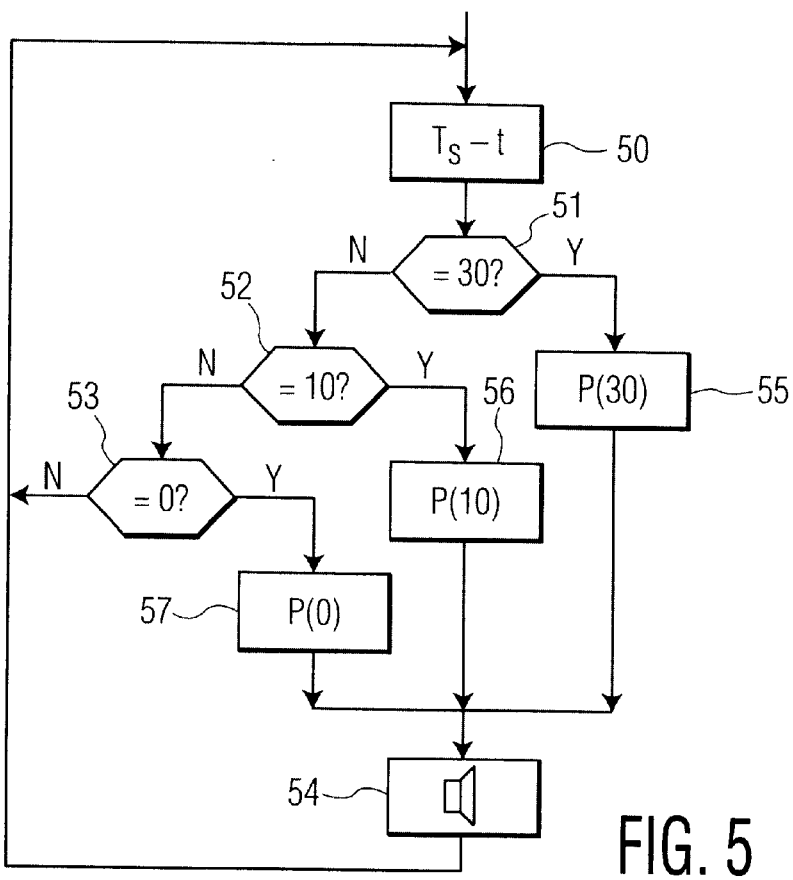

A particular advantage of the invention described so far is that even unskilled users are taught associations between program categories and corresponding auditive signals. Said associations are further exploited in further embodiments of the receiver. FIG. 5 shows a flow chart of operations carried out by the Microprocessor 6 in such an embodiment. One feature of this embodiment is that the auditive reminder or alert signal, which the receiver produces when a desired television program is about to start, is associated with the program category of the program.

In FIG. 5, a step 50 is performed in which the length of the time interval $T_S-t$ between the start time $T_S$ of the desired program (stored in the receiver's memory 10, see FIG. 1) and the current time t provided by the real-time clock 13 is calculated. Next, it is determined whether the program starts in 30 minutes (step 51), 10 minutes (step 52) or in the next minute or so (step 53). If none of these conditions is fulfilled, the microprocessor returns to the step 50 to update the time interval. If one of the conditions is fulfilled, a step 54 is performed in which the microprocessor reads the waveform-defining control signal associated with the desired program category from memory 10 and applies said signal to the sound source 14 for reproduction by the speaker 5. The user is thus informed by an alert signal that the desired television program is about to start. The character of the signal (for example, cheering audience or gong-stroke) informs him which program category (sports event or news magazine, respectively) the reminder relates to.

Further features are obtained when the receiver includes the sound-manipulating means 15 already shown in FIG. 1 but not discussed yet. In this embodiment, the signal from the sound source 14 is subjected to manipulation in response to an applied parameter setting value P. The parameter P is one which is indicative of the perceived distance between the receiver and the user. Examples will be described hereafter. In this embodiment, the reminder signal is perceived as sounding nearer as the actual start of the program approaches. To this end, the flow chart shown in FIG. 5 includes a step 55 which is performed when the desired program starts in 30 minutes. In this step, the microprocessor applies a sound-manipulating parameter value P(30) which causes the alert signal to sound relatively far away. A step 56 is performed when the desired program starts in 10 minutes. In this step, the microprocessor applies a sound-manipulating parameter value P(10) which causes the alert signal to sound nearer. A step 57 is performed when the desired program actually starts. Now, the microprocessor applies a sound-manipulating parameter value P(0) which makes the alert signal sound very obtrusive.

Figure 6:
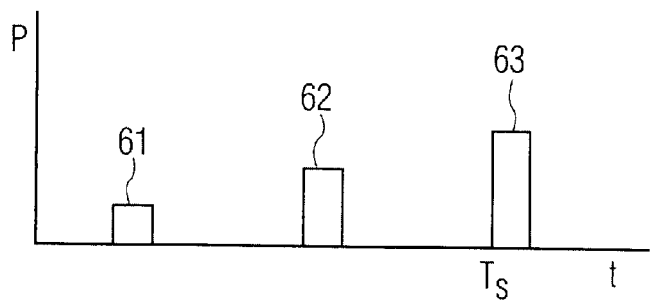
FIG. 6 shows an example of sound parameter setting values as a function of time.

FIG. 6 shows the sequence of auditive signals produced by the latter embodiment. $T_S$ denotes the beginning of a desired television program. Reference numeral 61 denotes the first alert signal which is given 30 minutes in advance and has the parameter value P(30). Reference numeral 62 denotes the second alert signal which is given 10 minutes in advance and has the parameter value P(10). Reference numeral 63 denotes the final reminder signal having the parameter value P(0) which is produced at the time $T_S$.

Figure 7:
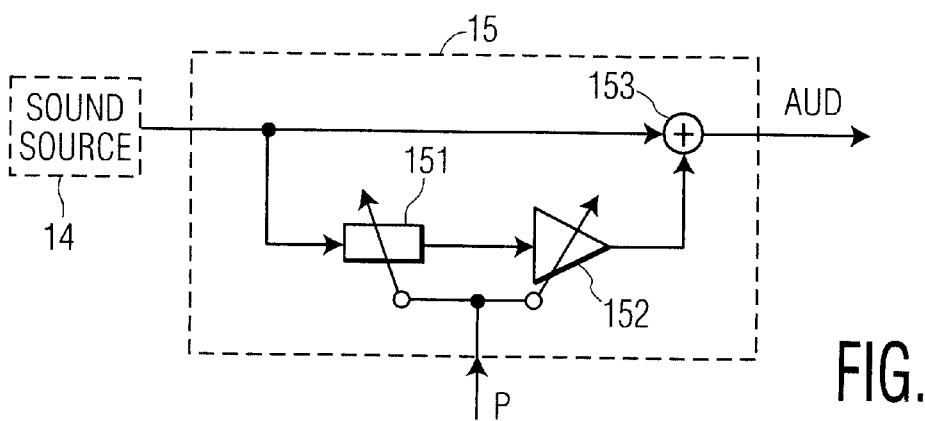
FIG. 7 shows an embodiment of sound manipulating means which are shown in FIG. 1.

The sound-manipulating means 15 may take the form of a controllable amplifier which amplifies the sound intensity (volume) in response to the applied parameter setting value P. The higher the sound volume, the smaller the perceived distance between receiver and user. The sound-manipulating means may also take the form of a controllable high-pass filter for adjusting the amount of high frequencies in the sound signal. As the filter passes higher frequencies, the perceived distance is smaller. Actual implementations of these embodiments are well-known in the art and therefore not shown in further detail. A particularly attractive embodiment of the sound manipulating means 15 is shown in FIG. 7. This embodiment comprises one or more variable delay elements 151 (one being shown in the Figure), possibly in combination with a controllable amplifier 152. The embodiment further comprises an adder 153 for adding the delayed signal (which represents reverberation) to the 'direct' sound. The presence of reverberation in a sound signal suggests distance from the sound source. The above embodiments may be combined. A sound source seems to be far away if the intensity is low, high frequencies are suppressed and much reverberation is added. Conversely, the sound is perceived as being produced nearby if the volume is high, high frequencies are present, and reverberations are absent.

It is to be noted that the feature of manipulating the sound to represent distance-in-time is not applicable to the reminder signal only. Notably, the features explained above with reference to FIGS. 4 and 5 can be combined. Thus, while moving the cursor through the various television programs in an on-screen program guide, a sound signal is produced which is indicative of the program category, whereas, at the same time, the relevant parameter of the signal is indicative of the time when said program is broadcast.

In summary, a television receiver with an electronic program guide is disclosed, which allows a user to navigate through an overview of scheduled television programs each belonging to one of a plurality of program categories. Upon highlighting a program item in the guide, or upon highlighting a pictogram representing an available program category, the receiver produces an auditive signal which is characteristic of the relevant program category. This provides an additional feedback to the user which eases the process of navigating through on-screen EPG menus. In embodiments of the receiver, the respective auditive signal is also produced as an alert signal (reminder) that a desired program is about to start. A sequence of such reminders may be given at different instants of time before the program starts. By manipulating a parameter, which is characteristic of a perceived distance from user to receiver (e.g. volume), the auditive signal also indicates the time to lapse until the start of the desired program.

What is claimed is:

1. A television receiver for receiving television programs each belonging to one of a plurality of program categories, comprising:
    means for displaying menu items associated with respective program categories;
    user-operable input means for highlighting one of said menu items; and
    means for reproducing, in response to highlighting a menu item, an auditive signal being characteristic of the corresponding program category, and manipulating a parameter of the signal which is indicative of the time to lapse until the start of the selected television program.

2. The television receiver as claimed in claim 1, further comprising:
    user-operable means for selecting a desired television program to be received when it is broadcast; and
    means for reproducing the auditive signal which is characteristic of the program category of the selected television program when said television program is about to be broadcast.

3. The television receiver as claimed in claim 1, wherein said parameter is a parameter which is characteristic of a perceived distance from the user to said receiver, a larger perceived distance representing a larger time to lapse.

4. The television receiver as claimed in claim 3, wherein said parameter is the sound intensity.

5. The television receiver as claimed in claim 3, wherein said parameter is the intensity of reflections added to said auditive signal.

6. The television receiver as claimed in claim 3, wherein said parameter is the presence of high frequencies in the frequency spectrum of said auditive signal.

7. A receiver capable of receiving television programs, each of received television programs belonging to one of a plurality of program categories, said receiver comprising:
    an interface operable to receive an input identifying a selected one of said plurality of program categories; and
    circuitry operable, in response to said received input, to (i) reproduce an auditive signal characteristic of said selected one of said plurality of program categories and (ii) manipulate a parameter of the auditive signal indicative of the time to lapse until the start of the selected television program.

8. The receiver capable of receiving television programs as set forth in claim 7 wherein said interface is further operable to display menu items associated with respective program categories.

9. The receiver capable of receiving television programs as set forth in claim 8 wherein said interface is further operable to highlight one of said menu items.

10. The receiver capable of receiving television programs as set forth in claim 7 further comprising (i) user-operable means for selecting a desired television program to be received when it is broadcast and (ii) means for reproducing the auditive signal which is characteristic of the program category of the selected television program when said television program is about to be broadcast.

11. The receiver capable of receiving television programs as set forth in claim 7 wherein said parameter is characteristic of a perceived distance from the user to said receiver a larger perceived distance representing a larger time to lapse.

12. The receiver capable of receiving television programs as set forth in claim 7 wherein said parameter is the sound intensity.

13. The receiver capable of receiving television programs as set forth in claim 7 wherein said parameter is one of (i) the intensity of reflections added to said auditive signal, and (ii) the intensity of high frequencies in the frequency spectrum of said auditive signal.

14. A method of operating a receiver, said receiver capable of receiving television programs wherein each of received television programs belongs to one of a plurality of program categories, said method of operation comprising the steps of:

receiving an input identifying a selected one of said plurality of program categories at an interface;

reproducing, in response to said received input, an auditive signal characteristic of said selected one of said plurality of program categories; and manipulating a parameter of the auditive signal indicative of the time to lapse until the start of the selected television program.

15. The method of operating a receiver as set forth in claim 14 further comprising the step of displaying menu items associated with respective program categories at said interface.

16. The method of operating a receiver as set forth in claim 15 further comprising the step of highlighting one of said menu items at said interface.

17. The method of operating a receiver as set forth in claim 14 further comprising the steps of:

selecting a desired television program to be received when it is broadcast; and reproducing the auditive signal which is characteristic of the program category of the selected television program when said television program is about to be broadcast.

18. The method of operating a receiver as set forth in claim 14 wherein said parameter is characteristic of a perceived distance from the user to said receiver a larger perceived distance representing a larger time to lapse.

19. The method of operating a receiver as set forth in claim 14 wherein said parameter is the sound intensity.

20. The method of operating a receiver as set forth in claim 14 wherein said parameter is one of (i) the intensity of reflections added to said auditive signal and (ii) the intensity of high frequencies in the frequency spectrum of said auditive signal.

\* \* \* \* \*